(12) United States Patent
Griffin et al.

(10) Patent No.: US 6,240,153 B1
(45) Date of Patent: *May 29, 2001

(54) REACTOR STUD CLEANING BOOTH

(75) Inventors: John S. Griffin, Bay City; William G. Mikulenka, El Campo; Alan W. Plunkett, Francitas, all of TX (US)

(73) Assignee: STP Nuclear Operating Company, Wadsworth, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,231

(22) Filed: Jun. 11, 1998

(51) Int. Cl.$^7$ .............. G21C 13/02; B08B 1/04
(52) U.S. Cl. ............ 376/260; 376/249; 376/245; 376/463
(58) Field of Search .................. 376/245, 249, 376/260, 463

(56) References Cited

U.S. PATENT DOCUMENTS

| | | | | |
|---|---|---|---|---|
| 4,165,549 | * | 8/1979 | Wennerstrom et al. | 15/88 |
| 4,452,753 | * | 6/1984 | Wentzell et al. | 376/249 |
| 4,481,814 | * | 11/1984 | Wentzell | 73/432 R |
| 4,630,410 | * | 12/1986 | Cavada et al. | 51/410 |
| 4,675,967 | * | 6/1987 | Okada | 29/240 |
| 5,110,049 | * | 5/1992 | Harris et al. | 239/209 |
| 5,309,490 | * | 5/1994 | Bayersten | 376/310 |
| 5,735,010 | * | 4/1998 | Burner et al. | 15/88 |
| 5,819,369 | * | 10/1998 | Falvo et al. | 15/344 |
| 6,023,807 | * | 2/2000 | Beissner | 15/88 |

FOREIGN PATENT DOCUMENTS

| | | | | |
|---|---|---|---|---|
| 8-015491 | * | 1/1996 | (JP) | 376/245 |
| 8-112764 | * | 5/1996 | (JP) | 376/245 |
| 10-094765 | * | 4/1998 | (JP) . | |
| 90/05596 | * | 5/1990 | (WO) . | |

* cited by examiner

Primary Examiner—Michael J. Carone
Assistant Examiner—Jack Keith
(74) Attorney, Agent, or Firm—Bracewell & Patterson, L.L.P.

(57) ABSTRACT

A reactor stud cleaning apparatus is presented for cleaning studs, nuts, and washers used to secure reactor heads on nuclear reactors. The cleaning apparatus is a self-contained unit having a housing that includes two independent sealable compartments allowing cleaning of two studs simultaneously. Each sealable compartment has a topside covering with a port that allows reactor studs to be lowered into the apparatus keeping the longitudinal axis of the reactor stud maintained in a substantially vertical position. Inside the sealable compartments is a turn table for vertically mounting a reactor stud and for rotating the stud about its longitudinal axis. Brushes, rotatably mounted inside the compartment, are used to clean the reactor stud. The apparatus also has a cleaning fluid circulation system for circulating solvents or other cleaning agents or fluids over the reactor stud during cleaning.

22 Claims, 4 Drawing Sheets

REACTOR STUD CLEANING BOOTH

SPECIFICATION

BACKGROUND OF THE INVENTION

1. Field of the Invention

The present invention relates to cleaning studs or bolts. More particularly, the invention relates to an apparatus for safely and effectively cleaning the studs used to secure reactor heads on nuclear reactors.

2. Description of the Related Art

Nuclear reactor vessels typically have had a reactor head secured to the reactor vessel by large studs or bolts. The reactor studs were very large, typically around 6 feet in length and weighing up to one thousand pounds (1000 lbs.) or more. When the nuclear reactors were shut down at scheduled intervals for maintenance and inspection, the reactor studs had to be removed for cleaning and inspection.

The size and weight of the reactor studs made cleaning of the studs a cumbersome and time consuming process. The cleaning process traditionally involved using an A-frame assembly and a manual chain hoist to move the reactor studs into position for cleaning. The reactor studs were then cleaned by hand using brushes or rags to remove any build up of oxides, residues, or dried lubricants.

There were several problems with this process for cleaning reactor studs. The cleaning process was very laborious and consumed a significant amount of manual labor. In addition, because of the possibility that the reactor studs were somewhat radioactive, personnel could only be exposed to the studs for a short period of time. Another problem with the traditional reactor stud cleaning process was that it created a large amount of waste such as rags, scrubbing pads, and brushes that had to be treated as radioactive waste.

To overcome the problems associated with manual cleaning of the reactor studs, stud cleaning machines were developed such as those disclosed in U.S. Pat. Nos. 4,165,549 and 4,452,753. These machines had housings in which a stud was placed so that the stud's longitudinal axis extended in the horizontal direction. The studs were rotated along the longitudinal axis inside the housings and cleaning was accomplished by the rotating brushes.

There were several problems with these machines. First, the stud had to be positioned in a horizontal plane requiring extra handling of the potentially radioactive stud. Additionally, the machines used a mechanical cleaning process and did not have capability to utilize solvents and other cleaning agents. Further, the machines only had the capability of cleaning one reactor stud at a time.

U.S. Pat. No. 4,630,410 similarly disclosed an apparatus having horizontal housing for cleaning reactor studs. However, in this apparatus, the rotary brushes were replaced with a high pressure spray nozzle that used water and an abrasive to clean the stud. This apparatus shared many of the same problems including requiring additional handling to put the studs in the horizontal position and being limited to cleaning one reactor stud at a time.

SUMMARY OF THE INVENTION

Briefly, the present invention provides a reactor stud cleaning apparatus for cleaning connector studs, nuts, and washers used to secure reactor heads on nuclear reactors. The cleaning apparatus is a self-contained unit having a housing that includes at least two independent sealable compartments allowing cleaning of two or more studs at a time. Each sealable compartment has a topside covering with a port that allows the reactor studs to be lowered into the apparatus keeping the longitudinal axis of the reactor stud maintained in a substantially vertical position. Inside the sealable compartments is a turntable for vertically mounting a reactor stud and for rotating the stud about its longitudinal axis. Brushes rotatably mounted inside the compartment are used to clean the reactor stud. The ability to keep the reactor studs in a vertical position decreases the handling required and therefore the safety risk associated with handling of the potentially radioactive studs.

Preferably, the apparatus also has a cleaning agent circulation system for circulating solvents or other cleaning agents over the reactor stud during cleaning.

The circulation system of the present invention stores cleaning agent in a sump. A pump is used to pump the cleaning agent from the sump to a spray nozzle where the agent is sprayed over the reactor stud during cleaning. The cleaning agent is then drained from the compartment and passed through a filter to remove contaminants before it is returned to the sump for reuse. Spent cleaning agent can be drained from the sump and disposed of according to appropriate hazardous waste regulations. The cleaning agent circulation system enhances the cleaning of the reactor studs, while the amount of waste generated is minimized by filtering and reusing the cleaning agent.

BRIEF DESCRIPTION OF THE DRAWINGS

A better understanding of the invention can be obtained when detailed description set forth below is reviewed in conjunction with the accompanying drawings, in which.

DETAILED DESCRIPTION OF INVENTION

Figure 1:
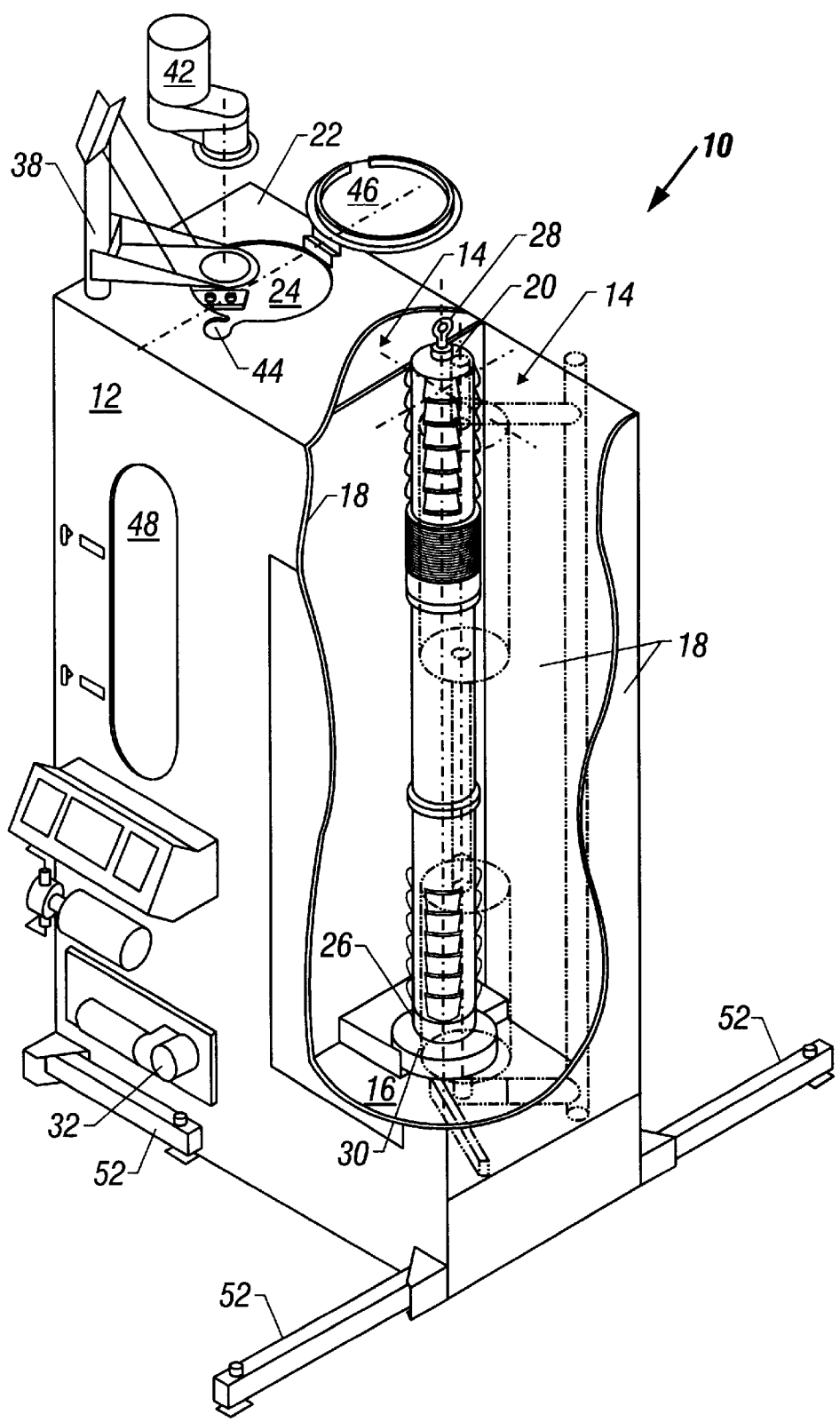
FIG. 1 is an isometric view of a frontal portion of the reactor stud cleaning booth according to the present invention, with portions removed to show the positioning of a reactor stud in the booth.

As shown in FIG. 1, the present invention is an apparatus 10 for cleaning large reactor studs 20 which are used to secure reactor heads on nuclear reactors. The present invention overcomes many of the problems of the prior art by providing an apparatus 10 that allows reactor studs 20 to be cleaned in the vertical position. Additionally, the present invention provides for cleaning multiple reactor studs 20 within apparatus 10 thereby increasing the efficiency of the cleaning process. Further, apparatus 10 of the present invention provides for efficient cleaning of reactor studs 20 using both a mechanical cleaning process and cleaning solvents which are recycled and reused.

Apparatus 10 is a self-contained unit having a housing 12 that encloses sealable compartments 14. As shown, the housing 12 encloses two or more sealable compartments 14 each of which is capable of enclosing a reactor stud 20 for cleaning. However, the apparatus of the present invention can be constructed to have multiple sealed compartments for individually cleaning multiple reactor studs. Alternatively, the apparatus of the present invention can be constructed with a single sealable compartment 14 for cleaning a single reactor stud 20.

The sealable compartment 14 has a base 16, vertical walls 18, and a top side covering 22. Top side covering 22 has a port 24 for each compartment 14 which allows reactor stud 20 to be lowered into sealable compartment 14 in order to be cleaned. Each port 24 has a port covering 46 that is hinged over port 24 and seals compartment 14 when in the closed position.

As can be seen, reactor stud 20 is lowered into sealable compartment 14 such that it longitudinal axis remains in a substantially vertical position. The base 26 of reactor stud 20 is mounted on a turntable 30 keeping the longitudinal axis of stud 20 in the vertical position. Turntable 30 not only provides a mounting support for mounting reactor stud 20, but it also provides for the rotation of the stud 20 about its longitudinal axis.

With the present invention it has been found that the ability to set reactor stud inside apparatus 10 while keeping its longitudinal axis in a vertical direction is a significant advantage over the prior art. Reactor stud 20 can be lifted out of its original position using a crane or other device by attaching the crane to lifting connection 28. When lifted by the crane in such manner, reactor stud 20 will naturally hang with its longitudinal axis in the vertical axis. Prior art cleaning machines required additional handling to place reactor stud 20 with its longitudinal axis in the horizontal direction. The present invention eliminates this unnecessary handling by allowing reactor stud 20 to be lowered through port 28 and directly into sealable compartment 14 of apparatus 10. This decreased handling significantly decreases safety risks associated with cleaning reactors studs 20.

Figure 2:
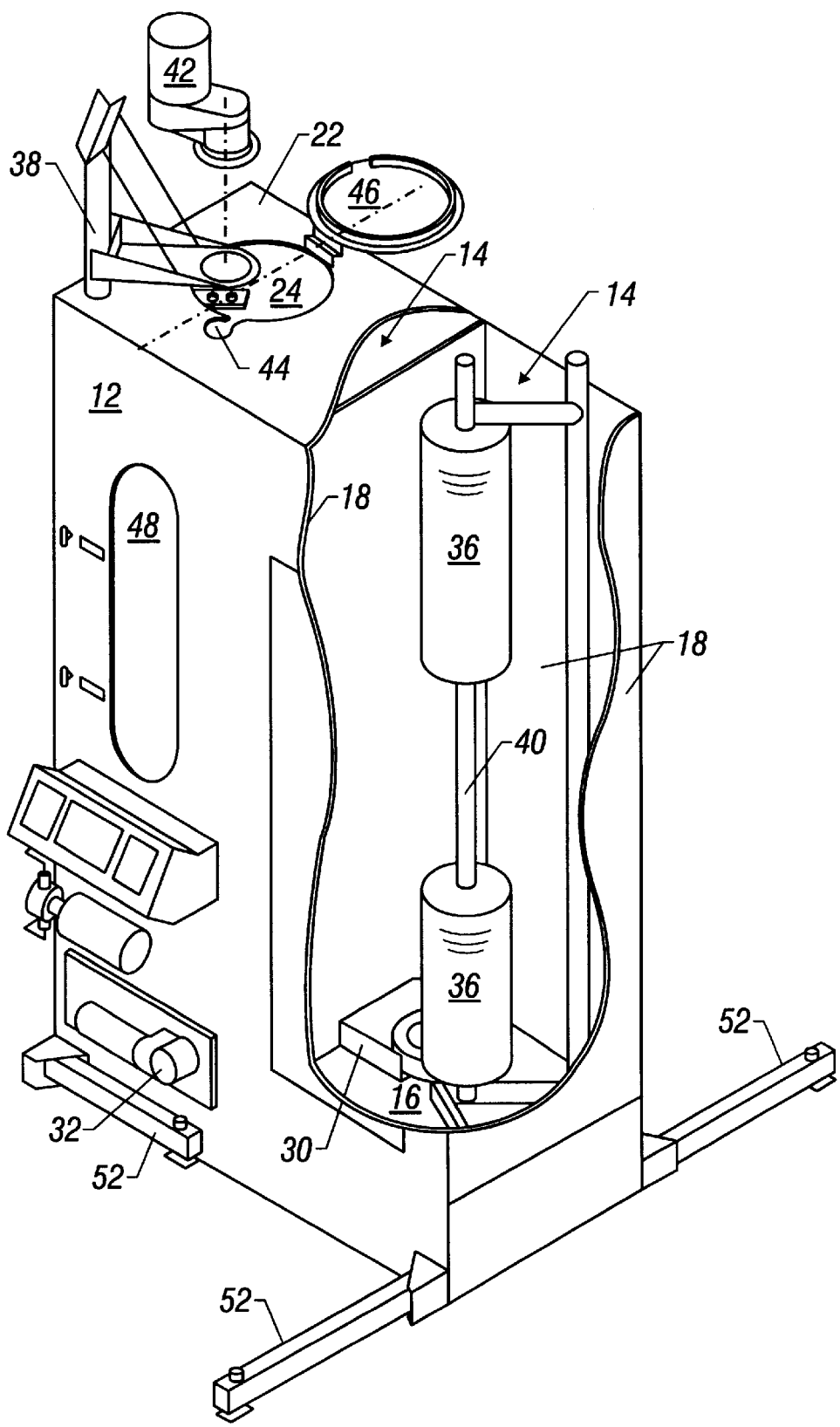
FIG. 2 is an isometric view of the frontal portion of the reactor stud cleaning booth of FIG. 1 with the reactor stud removed.

As shown in FIG. 2, compartment 14 also contains a cleaning mechanism, preferably brushes 36, rotatably mounted on a brush support 38. Brush support 38 has a shaft 40 that when driven by motor 42 rotates brushes 36 to clean reactor stud 20.

Preferably, brushes 36 are rotated in the reverse direction from which turntable 30 rotates studs 20 to enhance cleaning.

Brush support 38 can be moved from a first position in which shaft 40 is placed in notch 44 to a second position where shaft 40 extends through port 24. Brush support 38 is placed in the first position to prevent the brushes from interfering with the initial placement and setting of reactor stud 20 as it is lowered through port 24 and into sealable compartment 14. After reactor stud 20 has been mounted, brush support 38 is then moved into the second position to allow brushes 36 to intimately contact reactor stud 20.

Figure 3:
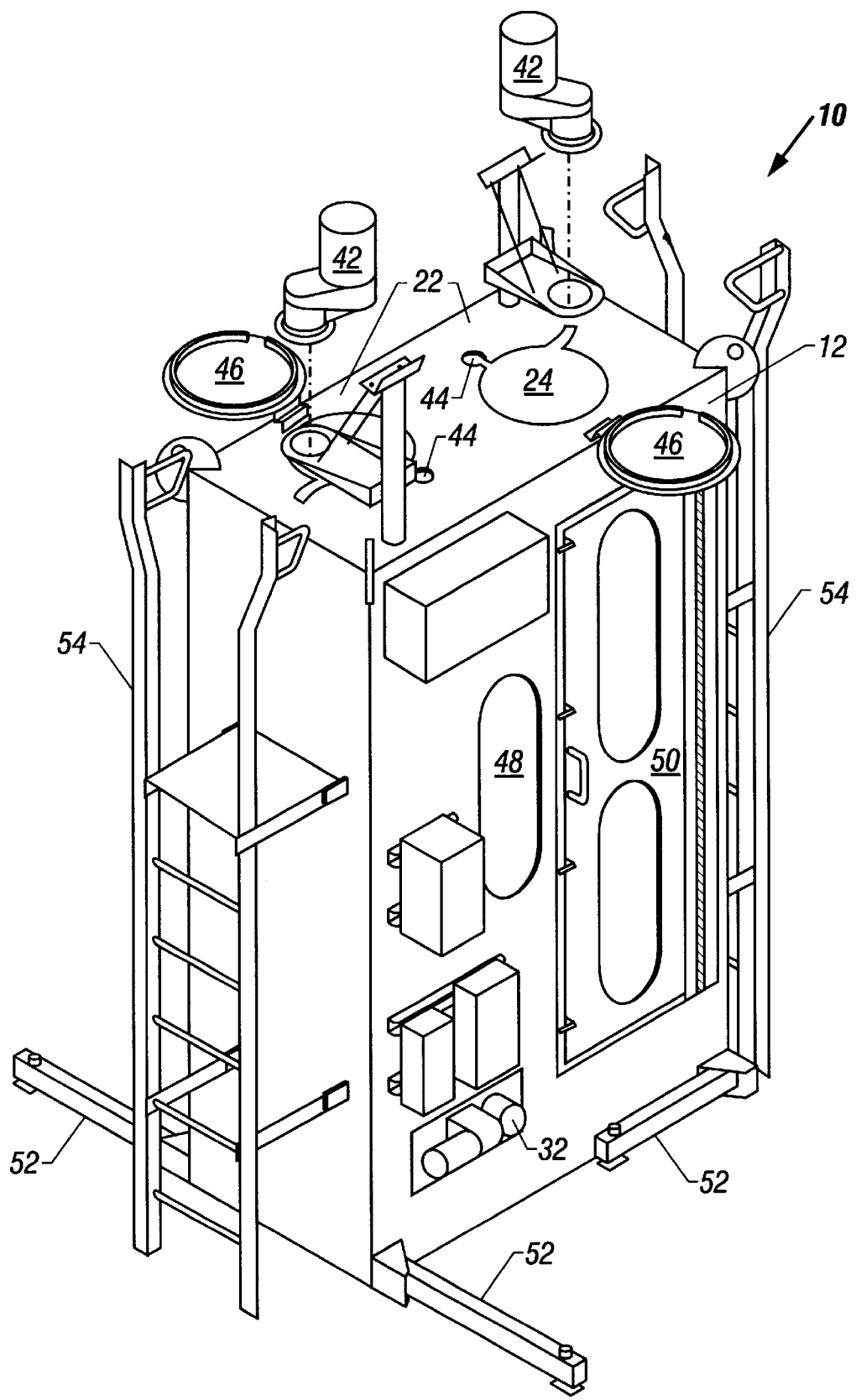
FIG. 3 is an isometric view of a rear portion of the reactor stud cleaning booth of FIG. 1.

As shown in FIG. 3, sealable compartment 14 preferably has a fluid-tight viewing port or window 48 that allows viewing of the reactor stud during the cleaning process. Additionally, sealable compartment 14 may have an access door 50 that allows access to sealable compartment 14. Access door 50 allows technicians to assist, if needed, in mounting reactor stud 20 in the proper position on turntable 30. Further, access door 50 allows access to the stud for inspection after the cleaning process is complete.

Apparatus 10 is totally self-contained and is a portable device. Housing 12 has retractable stabilizing supports 52 that can be retracted when moving apparatus 10 to a different location and can be extended to stabilize apparatus 10 during the cleaning process. Preferably, housing 12 has access ladders 54 to provide technicians access to top coverings 22 to assist in moving reactor studs 20 through ports 24.

Figure 4:
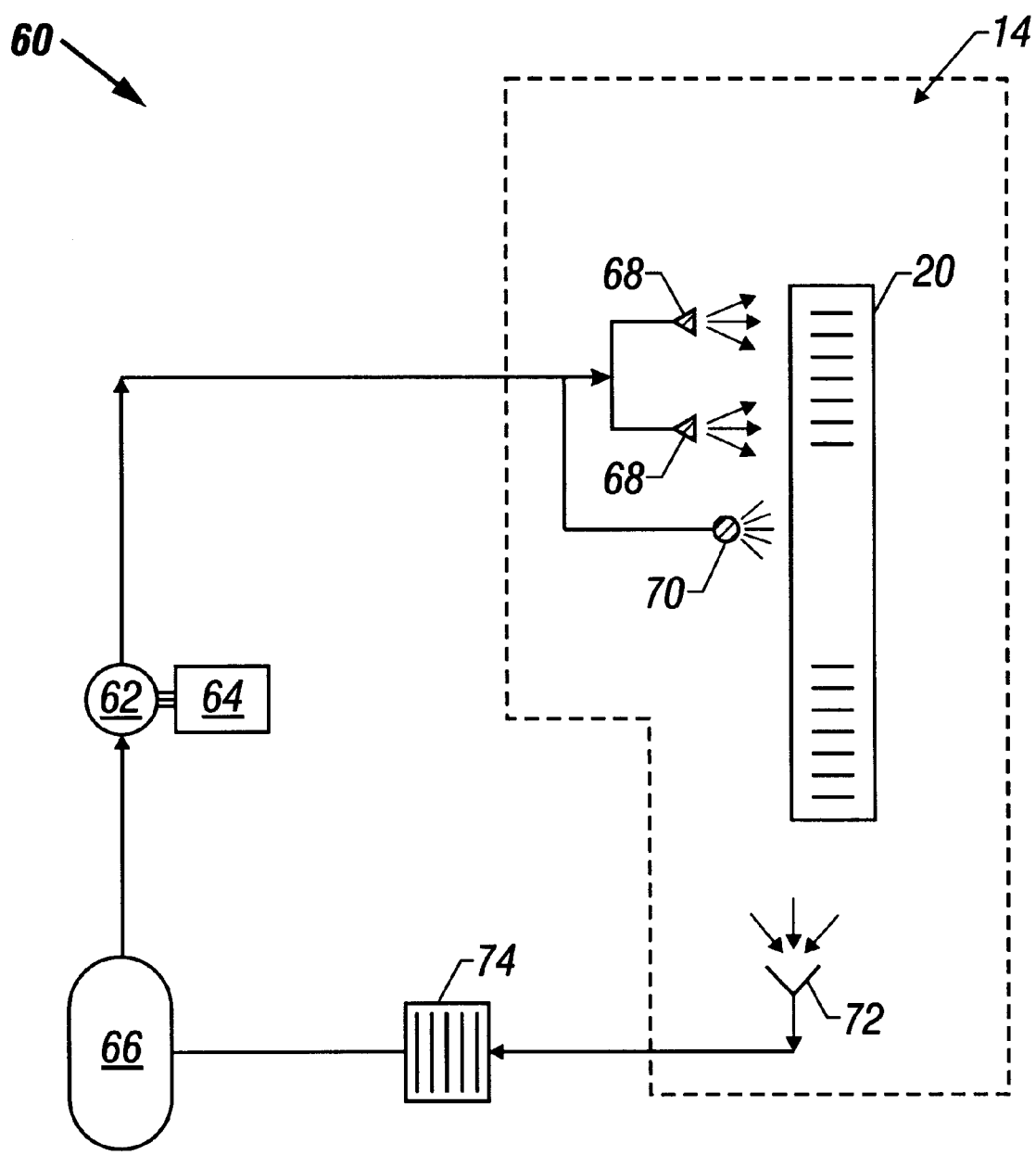
FIG. 4 is a process flow diagram of the solvent cleaning and recirculation system according to the present invention.

Referring to FIG. 4, preferably, apparatus 10 of the present invention is equipped with a solvent circulation system 60 for applying solvent to reactor stud 20 during the cleaning process to enhance cleaning. Solvent circulation system 60 can be used to recirculate conventional solvents or other cleaning agents known to those skilled in the art for cleaning reactor studs.

Solvent is stored in a solvent sump 66 when recirculation system 60 is not in use. When the cleaning process begins, pump 62 under power of motor 64 pumps solvent from sump 66 and directs it through spray nozzles 68 onto reactor stud 20. Spray nozzles 68 are of a design commonly known to those skilled in the cleaning art. The solvent which is sprayed from nozzle 68 onto reactor stud 20 drains from compartment 14 through a drain 72. The solvent is then filtered in filter 74 to remove any contaminants picked up in the cleaning process. The filtered solvent then drains back into solvent sump 66. Spent solvent can be easily drained from sump 66 and disposed of according to acceptable hazardous waste regulations. Preferably, apparatus 10 is also equipped with a movable spray wand 70 which can be positioned to apply solvent to reactor stud 20 to assist in cleaning particular areas.

Solvent recirculation system 60 provides several advantages to apparatus 10 of the present invention. Spray nozzles 68 and spray wand 70 assist the brushes 36 in cleaning reactor stud 20. Additionally, the use of a solvent eliminates airborne contamination that might normally be generated as mechanical brushes engage the rotating reactor stud 20. Apparatus 10 of the present invention further enhances this feature by recirculating the solvent thereby minimizing any waste generated through the use of a solvent to enhance the cleaning process. Also, the sump can be easily drained for environmentally safe disposal of spent solvent.

FIG. 4 depicts a process flow sheet for a recirculation system to a single sealed compartment 14. However, as will be recognized, a single solvent recirculation 60 can be utilized with multiple sealed compartments 14. Each sealed compartment will have its own spray nozzles 68, spray wand 70, and drain 72. All sealed compartments 14 can utilize the same pump 62, solvent sump 66, and filter 74.

As can now be recognized, the apparatus of the present invention provides for ease and safety in cleaning the reactor studs used to secure reactor heads on nuclear reactors. The present invention overcomes many of the problems associated with prior art cleaning machines. Particularly, the present invention provides an apparatus which reduces stud handling by allowing the reactor studs to be cleaned in the vertical position. Additionally, the apparatus of the present invention provides for independent cleaning of multiple reactor studs simultaneously or in rapid sequence. Further, the apparatus of the present invention has a solvent recirculation system that provides the advantages of solvent cleaning while minimizing the amount of solvent waste created.

The foregoing disclosure and description of the invention are illustrative and explanatory thereof, and various changes in the details of the illustrated apparatus and construction and method of operation may be made without departing from the spirit of the invention.

What is claimed is:

1. An apparatus for cleaning a nuclear reactor stud comprising:
   a housing having a sealable compartment for enclosing the reactor stud during cleaning;
   said sealable compartment having a base, a top cover, and side walls;
   a port in the top cover of said sealable compartment for lowering the reactor stud into said sealable compartment;
   a port covering for the port for sealing the sealable compartment during cleaning of the reactor stud;
   a turntable mounted in said sealable compartment for mounting the reactor stud with the longitudinal axis of the stud in a substantially vertical position and for rotating the reactor stud about the longitudinal axis;
   a cleaning mechanism support within said sealable compartment;
   said cleaning mechanism support being movable from a first position for entry of the reactor stud onto the turntable to a second position for contact of said cleaning brush mechanism with the reactor stud;
   cleaning brush mechanisms rotatably mounted on said cleaning mechanism in said compartment for contacting and cleaning the reactor stud;
   said cleaning brush mechanisms comprising brushes which are cylindrically shaped, are rotatable around their longitudinal cylindrical axis, and are horizontally moveable between a first position out of contact with said reactor stud and a second position in contact with said reactor stud; and
   said reactor stud has a threaded portion along its length and said cylindrical brushes are of a length corresponding to the length of the threaded portion of the reactor stud.

2. The apparatus of claim 1, wherein said housing comprises at least two sealable compartments for enclosing reactor studs during cleaning.

3. The apparatus of claim 1, wherein said sealable compartment further comprises a viewing port for observing the interior of said compartment.

4. The apparatus of claim 1, wherein said sealable compartment further comprises a sealable access door.

5. The apparatus of claim 1 further comprising a cleaning fluid circulation system comprising a sump, an application nozzle for directing cleaning fluid on the reactor stud, a pump for delivering cleaning agent from the sump to each nozzle, a drain for collecting the cleaning agent from the reactor stud and returning the cleaning agent to the sump, and a filter for removing contaminants from the cleaning agent.

6. An apparatus for cleaning two or more nuclear reactor studs comprising:
   a housing having at least two sealable compartments for enclosing reactor studs during cleaning;
   said sealable compartments each having a base, a top cover, and side walls;
   a port in the top cover of each said sealable compartment for lowering a reactor stud into said sealable compartment;
   a port covering for the port in the top cover of each said sealable compartment during cleaning of the reactor stud;
   a turntable mounted in each said sealable compartment for mounting a reactor stud with the longitudinal axis of the stud in a substantially vertical position and for rotating the reactor stud about the longitudinal axis;
   a cleaning mechanism support within said sealable compartment;
   a cleaning mechanism comprising brushes rotatably mounted on said cleaning mechanism support for contacting and cleaning a reactor stud;
   a drive mechanism mounted on the top cover of the sealed compartment for rotating said brushes of said cleaning mechanism;
   a cleaning fluid circulation system comprising a sump, an application nozzle mounted in each said compartment for directing cleaning fluid on a reactor stud a pump for delivering cleaning agent from the sump to each nozzle, a drain for collecting the cleaning agent from the reactor stud and returning the cleaning agent to the sump, and a filter for removing contaminants from the cleaning agent.

7. The apparatus of claim 6, wherein each said sealable compartment further comprises a viewing port for observing a reactor stud.

8. The apparatus of claim 6, wherein each said sealable compartment further comprises a sealable access door.

9. The apparatus of claim 6, wherein said cleaning fluid circulation system further comprises an adjustable spray wand for delivering cleaning agent to the reactor stud.

10. The apparatus of claim 6, wherein said drive mechanism rotates said cleaning mechanism in a direction opposite that of the rotation of said turntable.

11. The apparatus of claim 6 further comprising retractable stabilizing supports for the housing.

12. The apparatus of claim 6, wherein said brushes are cylindrically shaped and are rotatable around the longitudinal axis of the cylinder.

13. The apparatus of claim 12, wherein the reactor stud has a threaded portion along its length and said cylindrical brushes are of a length corresponding to the length of threaded portion of the reactor stud.

14. An apparatus for cleaning a nuclear reactor stud comprising: a housing having at least two sealable compartments for enclosing the reactor stud during cleaning;
   said sealable compartments having a base, a top cover, and side walls;
   a port in the top cover of each said sealable compartment for lowering the reactor stud into said sealable compartment;
   a port covering for the port in the top cover of each said sealable compartment during cleaning of the reactor stud;

a turntable mounted in each of said sealable compartments for mounting the reactor stud with the longitudinal axis of the stud in a substantially vertical position and for rotating the reactor stud about the longitudinal axis;

a cleaning mechanism support within said sealable compartment;

a cleaning mechanism comprising brushes rotatably mounted on said cleaning mechanism support for contacting and cleaning the reactor stud;

a brush drive motor for rotating said brushes of said cleaning mechanism;

a drive mechanism for rotating said brushes on said cleaning mechanism support; and a cleaning fluid circulation system, said system comprising a sump, an application nozzle for applying cleaning agent to the reactor stud, a pump for delivering cleaning agent from the sump to the nozzle, a drain for collecting the cleaning agent from the reactor stud and returning the cleaning agent to the sump, and a filter for removing contaminants from the cleaning agent.

15. The apparatus of claim 14, wherein said sealable compartment further comprises a viewing port for observing the reactor stud.

16. The apparatus of claim 14, wherein said sealable compartment further comprises a sealable access door.

17. The apparatus of claim 14, wherein said cleaning fluid circulation system further comprises an adjustable spray wand for delivering cleaning agent to the reactor stud.

18. The apparatus of claim 14, wherein said drive mechanism is rotatably mounted over the top cover of said sealed compartment.

19. The apparatus of claim 14, wherein said drive mechanism rotates said cleaning mechanism in direction opposite that of the rotation of said turntable.

20. The apparatus of claim 14 further comprising retractable stabilizing supports for the housing.

21. The apparatus of claim 14, wherein said cleaning brushes are cylindrically shaped and are rotatable around the longitudinal axis of the cylinder.

22. The apparatus of claim 21, wherein the reactor stud has a threaded portion along its length and said cylindrical brushes are of a length corresponding to the length of the threaded portion of the reactor stud.

* * * * *